United States Patent
Le Rouzic et al.

(10) Patent No.: US 8,522,317 B2
(45) Date of Patent: Aug. 27, 2013

(54) METHOD AND A DEVICE FOR MAINTAINING AN ADDRESS TRANSLATION TABLE

(75) Inventors: Jean-Claude Le Rouzic, Trebeurden (FR); Régis Savoure, Lannion (FR)

(73) Assignee: France Telecom, Paris (FR)

( * ) Notice: Subject to any disclaimer, the term of this patent is extended or adjusted under 35 U.S.C. 154(b) by 291 days.

(21) Appl. No.: 12/742,271

(22) PCT Filed: Nov. 24, 2008

(86) PCT No.: PCT/FR2008/052118
§ 371 (c)(1),
(2), (4) Date: May 11, 2010

(87) PCT Pub. No.: WO2009/071830
PCT Pub. Date: Jun. 11, 2009

(65) Prior Publication Data
US 2010/0275246 A1    Oct. 28, 2010

(30) Foreign Application Priority Data
Nov. 30, 2007 (FR) .................... 07 59443

(51) Int. Cl.
*H04L 29/00* (2006.01)

(52) U.S. Cl.
USPC .............. 726/4; 726/18; 726/21; 713/172; 713/173; 713/174

(58) Field of Classification Search
USPC .............. 726/4; 713/182–186; 711/147–153
See application file for complete search history.

(56) References Cited

U.S. PATENT DOCUMENTS

| | | | |
|---|---|---|---|
| 6,886,103 B1* | 4/2005 | Brustoloni et al. | 726/15 |
| 2004/0174864 A1* | 9/2004 | Klaghofer | 370/352 |
| 2006/0045068 A1 | 3/2006 | Wu et al. | |
| 2006/0085548 A1 | 4/2006 | Maher, III et al. | |
| 2007/0021127 A1* | 1/2007 | Zheng | 455/456.1 |
| 2007/0033282 A1* | 2/2007 | Mao et al. | 709/226 |

FOREIGN PATENT DOCUMENTS
EP    1 841 170 A1    10/2007

* cited by examiner

*Primary Examiner* — Ghazal Shehni
(74) *Attorney, Agent, or Firm* — Drinker Biddle & Reath LLP (57) ABSTRACT

A device for maintaining an address translation table, placed in series between a user terminal and a third-party entity of a telecommunications network, is disclosed. The device is adapted to verify the existence in the address translation table of an entry specific to the exchange of application signaling messages using said protocol between the terminal and the third-party entity and, if there is no entry specific to the exchange of application signaling messages using said protocol between the terminal and the third-party entity, to create a specific entry in the address translation table associating with a private address and a private port of the terminal in a private network connecting it to said device a public address and a public port of the terminal in the telecommunications network and an indication of the validity of the entry, this validity indication taking into account the first reception time.

11 Claims, 4 Drawing Sheets

METHOD AND A DEVICE FOR MAINTAINING AN ADDRESS TRANSLATION TABLE

CROSS-REFERENCE TO RELATED APPLICATIONS

This application is the U.S. national phase of the International Patent Application No. PCT/FR2008/052118 filed Nov. 24, 2008, which claims the benefit of French Application No. 07 59443 filed Nov. 30, 2007, the entire content of which is incorporated herein by reference.

BACKGROUND

The field of the invention is that of telecommunications networks.

It finds non-limiting preferred applications in Voice over Internet Protocol (VoIP) telecommunications networks.

In Voice over IP networks in particular, users register periodically to inform the network of their presence, thus providing an address at which they can be contacted. In such networks in particular, it is usual for user terminals to access the network via a home gateway. As known in itself, this gateway includes a table in which it associates the IP address and the port associated with each of the terminals of the home network with an address and a port of that same gateway on the public network.

This table is known to persons skilled in the art as a network address translation (NAT) table. Here the term NAT is to be understood in a broad sense as encompassing the wider concept of network address and port translation (NAPT).

As is known in the art, gateways regularly delete the content of the address translation tables if they are not updated. One known method of keeping the address translation tables up to date is to force artificial exchanges of signaling between the user terminal and the network, as described below with reference to FIG. 1.

Figure 1:
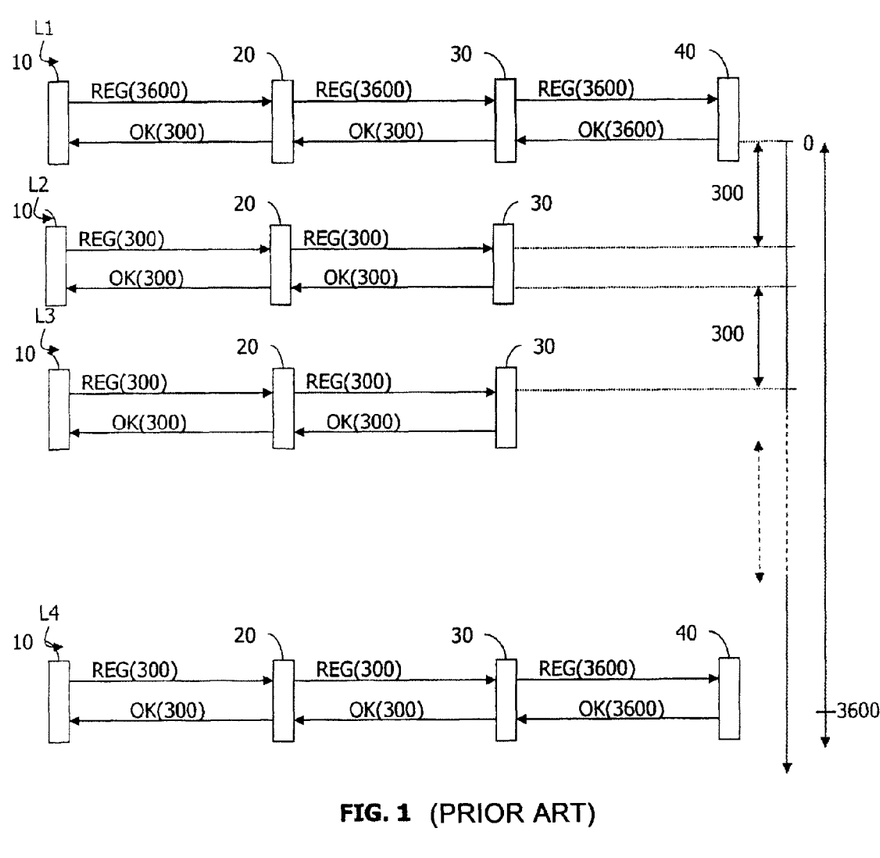
FIG. 1 shows diagrammatically a prior art mechanism for maintaining an address translation table.

This figure shows four exchanges of messages L1 to L4 by this mechanism. In this figure:
- the reference 10 designates a terminal;
- the reference 20 designates a home gateway or a router modem including a NAT table;
- the reference 30 designates a user collection unit able to communicate with the home gateway; and
- the reference 40 designates a network core unit able to manage user registration for a given service, for example Voice over IP, such as a Session Initiation Protocol (SIP) server.

With reference to the exchange of messages L1, the terminal 10 sends the network core entity 40 a request REG (3600) to register for one hour.

These messages pass through the home gateway 20 and the user collection unit 30, both of which are in series between the terminal 10 and the SIP server 40.

On reception of this message, the SIP server 40 authorizes maintaining the registration of the user in its databases for one hour by sending a message OK (3600).

In the prior art, the value of the subscription provided by the SIP server is then one hour.

To force the exchange of signaling linked to the registration of the user of the terminal 10 in order for the information to continue to be stored in the address translation table, the user collection unit 30 intentionally reduces the value of the subscription provided by the network by sending the terminal 10 via the home gateway 20 an authorization message of subscription value that is set at five minutes (300 seconds) in this example.

Consequently, and as shown for the exchange of messages L2, substantially 300 seconds after receiving the message modified by the user collection unit 30, the terminal 10 requests from the SIP server 40 registration for 300 seconds. It is known in the art that the Voice over IP terminals 10 adapt to the authorizations provided by the network core.

Of course, it is not necessary for the user collection unit 30 to route this registration request to the network core 40 because, in the example described here, the said core has already agreed to maintain the subscription of the terminal 10 for a subscription period of one hour.

Consequently, the user collection unit 30 merely sends the terminal 10 a new subscription authorization for a further 300 seconds.

The mechanism described for the exchange of messages L2 is repeated identically for the exchange of messages L3, as shown by the double-headed dashed-line arrow.

As is known in the art, the user collection unit 30 monitors in parallel with the above process whether the subscription provided by the SIP server 40 (which is one hour in this example) is approaching its expiry.

Assume that this is so when the user collection unit 30 receives the request for registration for five minutes during the exchange of messages L4.

The user collection unit 30 then replaces the value of the subscription minus 300 seconds in this registration message with the original subscription value of 3600 seconds, in order to solicit a new subscription of the terminal 10 with the SIP server 40 of one hour.

As described above with reference to the exchange of messages L1, the SIP server 40 agrees to a subscription of one hour and the user collection unit 30 substitutes in this message for the value of the subscription provided by the network core a reduced value set at 300 seconds, in order artificially to force exchange of signaling by the terminal 10 to maintain the address translation table in the home gateway 20 up to date.

A first drawback of the above mechanism is that it artificially generates superfluous application signaling message traffic in the access network, which obliges the operator to double the capacity of the Voice over IP service user collection units.

A second drawback of this mechanism is that it requires the introduction into the collection units of functions specific to generating this artificial traffic.

SUMMARY

There is therefore a requirement to propose a simpler and more effective solution for maintaining an address translation table of a home gateway or a router modem, in particular without generating superfluous messages in the access network.

This is achieved by a device for maintaining an address translation table, placed in series between a user terminal and a third-party entity of a telecommunications network, the device being characterized in that it is adapted:
- to intercept a registration request message sent by the terminal to said third-party entity using an application signaling protocol, said message being received by said device at a first reception time at a reception port dedicated to the exchange of messages using said protocol;

to verify the existence in the address translation table of an entry specific to the exchange of application signaling messages using said protocol between the terminal and the third-party entity; and if there is no entry specific to the exchange of application signaling messages using said protocol between the terminal and the third-party entity, to create a specific entry in the address translation table associating with a private address and a private port of the terminal in a private network connecting it to said device a public address and a public port of the terminal in the telecommunications network and an indication of the validity of the entry, this validity indication taking into account the first reception time and a first validity period.

With the assistance of one of the input ports dedicated to application signaling messages, the device of the invention for maintaining an address translation table recognizes that the message sent by the terminal to the third-party entity is a request message conforming to a particular application signaling protocol. This protocol corresponds to a specific type of entry in the address translation table with which it associates a validity indication specific to that entry.

Thus the invention is based on an entirely novel and inventive approach to maintaining an address translation table that relies on the ability of the device to recognize the application signaling protocol used in exchanges of messages between the terminal and the third-party entity and to create in the address translation table a specific entry concerning the exchanges of messages conforming to that protocol including a validity indication suited to that type of entry.

According to a first aspect of the invention, the first validity period has a predetermined value that is specific to said application signaling protocol. For example, this first validity period is configured to the usual duration of a registration subscription delivered by the third-party entity. An advantage of this is that, usually, the first validity indication corresponds to a registration period agreed by the third-party entity, which limits recourse to the superfluous messages of the prior art.

According to a second aspect of the invention, the registration request sent by the user terminal includes a required registration validity period and the first validity period is chosen to be equal to said required registration validity period.

An advantage of this is that the validity indication is specifically adapted to the user terminal registration request. Accordingly, if the request for the required registration period is accepted, the validity period of the entry corresponds to the duration of the registration subscription. Under such circumstances, it is therefore no longer necessary to have recourse to the prior-art mechanism for sending the superfluous messages.

According to a third aspect of the invention, the device for maintaining an address translation table is adapted:

to await an authorization message sent by the third-party entity to the public port of the user terminal in response to said request;

on reception at a second reception time of an authorization message from the third-party entity to the terminal, to extract a registration validity period, if there is one; and if there is a validity period and it is not zero, to update the validity indication of the entry on the basis of the second reception time and the extracted registration validity period.

According to this third aspect of the invention, the validity indication of the entry specific to exchange of application signaling between the terminal and the third-party entity in accordance with a particular protocol is produced in two stages:

firstly, at the time of creating the entry and on the basis of a first validity period; this first validity period can have any value, for example a predetermined value of a few minutes or the value of the validity period of the registration requested by the user terminal, as referred to above; and secondly, when it intercepts the authorization message sent by the third-party entity, which is preferably a network input entity such as, for example, a proxy call session control function (P-CSCF) type application server in an IP Multimedia Subsystem (IMS) architecture, the device of the invention extracts therefrom a validity period of the registration; it uses this registration validity period to update the validity indication of the entry in the table.

As a result, the validity indication of the entry in the address translation table is updated on the basis of the registration or subscription period actually supplied by the application server. An advantage of this is that the device of this third aspect of the invention guarantees that maintaining the entry in the address translation table is in phase with a successful registration.

Another advantage is that it means that a short first validity period can be chosen, for example a few minutes, at the same time as avoiding the user terminal sending superfluous signaling messages for maintaining the address translation table up to the end of the subscription. One benefit of choosing a first validity period of a few minutes rather than a registration subscription period (at least one hour) is to ensure faster deletion of the entry from the address translation table in the event of the third-party entity rejecting the request from the user terminal.

Consequently, and in contrast to the prior art, the collection entity no longer has any role to play in maintaining the address translation table. In particular, it no longer has to detect a network address translation situation (NAT situation) or to substitute for the registration validity period value a lower value corresponding to the validity period of a few minutes usually assigned to a standard entry of an address translation table.

According to another aspect of the invention, the validity indication of the entry is updated by adding the validity period of the registration to the second reception time.

An advantage of this is that the entry specific to exchange of messages in accordance with the application signaling protocol between the terminal and the telecommunications network indicates the expiry time of the entry by means of a single value.

Alternatively, the validity indication can include a validity period of the entry equal to the validity period of the authorization and a time from which the validity period applies, for example the second reception time.

According to another aspect of the invention, if an entry specific to the exchange of application signaling messages using this protocol between said terminal and the telecommunications network already exists in the address translation table, said device relays the application signaling message directly to the third-party entity and awaits an authorization message.

According to another aspect of the invention, on reception of an authorization message including a zero registration validity period or no registration validity period, the device for maintaining an address translation table can delete the entry from the address translation table.

One advantage of this is that the entries of the translation table specific to exchanges of application signaling messages in accordance with the invention are freed as quickly as possible, which enables optimization of the resources of the address translation table.

In a correlated way, the invention provides a method of maintaining an address and ports translation table adapted to be implemented by a device placed in series between a user terminal of a private network and a third-party entity of a telecommunications network, the method being characterized in that it includes the following steps:

intercepting a registration request message sent by the terminal to said third-party entity using an application signaling protocol, said message being received by said device at a first reception time at a reception port dedicated to exchanges of messages using said protocol;

verifying the existence in the address translation table of an entry specific to the exchange of application signaling messages using said protocol between the terminal and the third-party entity; and if there is no entry specific to the exchange of application signaling messages using said protocol between the terminal and the third-party entity, creating a specific entry in the address translation table associating with a private address and a private port of the terminal in a private network connecting it to said device a public address and a public port of the terminal in the telecommunications network and an indication of the validity of the entry, this validity indication taking into account the first reception time.

According to one aspect of the invention, the method further includes the following steps:

awaiting an authorization message sent by the third-party entity to the user terminal in response to said request;

on reception at a second reception time of an authorization message from the third-party entity to the terminal, extracting a registration validity period, if there is one; and if there is a validity period and it is not zero, updating the validity indication of the entry on the basis of the second reception time and the registration validity period.

In one particular implementation, the steps of the method of maintaining an address translation table are determined by computer program instructions.

Consequently, the invention also provides a computer program on an information medium, that program being adapted to be executed in a device for maintaining an address translation table or more generally in a computer and including instructions adapted to execute the steps of a method as described above for maintaining an address translation table.

This program may use any programming language and may take the form of source code, object code or a code intermediate between source code and object code, such as a partially-compiled form, or any other desirable form.

The invention also provides a computer-readable information medium including instructions of a computer program as referred to above.

The information medium may be any entity or device capable of storing the program. For example, the medium may comprise storage means, such as a ROM, for example a CD ROM or a micro-electronic circuit ROM, or magnetic storage means, for example a floppy disk or a hard disk.

Moreover, the information medium may be a transmissible medium such as an electrical or optical signal, suitable for being routed via an electrical or optical cable, by radio, or by other means. The program of the invention may in particular be downloaded over an Internet-type network.

Alternatively, the information medium may be an integrated circuit incorporating the program, the circuit being adapted to execute the method in question or to be used in its execution.

The device and the method of the invention may in particular be executed by a home gateway or a router modem.

Consequently, the invention further provides a home gateway or router modem for connecting a user terminal of a private network to a third-party entity of a telecommunications network, the gateway or modem being characterized in that it includes:

an address translation table able to store an entry specific to the exchange of application signaling messages between the user terminal and the third-party entity of the telecommunications network using an application signaling protocol, said entry associating a private address and a private port of the terminal in the private network with a public address and a public port of the terminal in the telecommunications network and an indication of the validity of said entry; and a device for maintaining the address translation table as described above.

The invention finally provides an address translation table adapted to associate in an entry a private address and a private port of a terminal in a private network with a public address and a public port of that terminal in a telecommunications network, the table being characterized in that it includes an entry specific to the exchange of application signaling between the user terminal and a third-party entity of the telecommunications network using an application signaling protocol, said entry further including an indication of the validity of said entry.

BRIEF DESCRIPTION OF THE DRAWINGS

Other advantages and features of the invention become more clearly apparent on reading the following description by way of illustrative and non-limiting example only of one particular embodiment of the invention and from the appended drawings, in which.

DETAILED DESCRIPTION

The general principle of the invention is to use a mechanism for maintaining an address translation table that is specific to the entries in the table that relate to using an application signaling protocol to exchange application signaling messages between a user terminal of a private network and a third-party entity of a telecommunications network.

There is considered below the example of a user terminal seeking to access a Voice over IP (VoIP) service via an IMS network. The user terminal therefore sends a service registration request to an access entity of the IMS network using an application signaling protocol, for example the Session Initiation Protocol (SIP).

Note that the invention is not limited to this example, however, and that the mechanism of the invention for maintaining an address translation table can be triggered following a user terminal sending a registration request using any other application signaling protocol, for example the H.323 protocol, the H.248 protocol or the Media Gateway Control Protocol (MGCP).

Below, the expression registration request must be interpreted in a broad sense, i.e. as not limited to an initial registration request but also encompassing a registration renewal request or a deregistration request. Note also that some application signaling protocols specify other types of registration request. This is the situation with the SIP, for example, in which a user terminal sends an active subscriptions listing registration request enabling it to obtain in response the validity period or remaining subscription period for each contact address.

Figure 2:
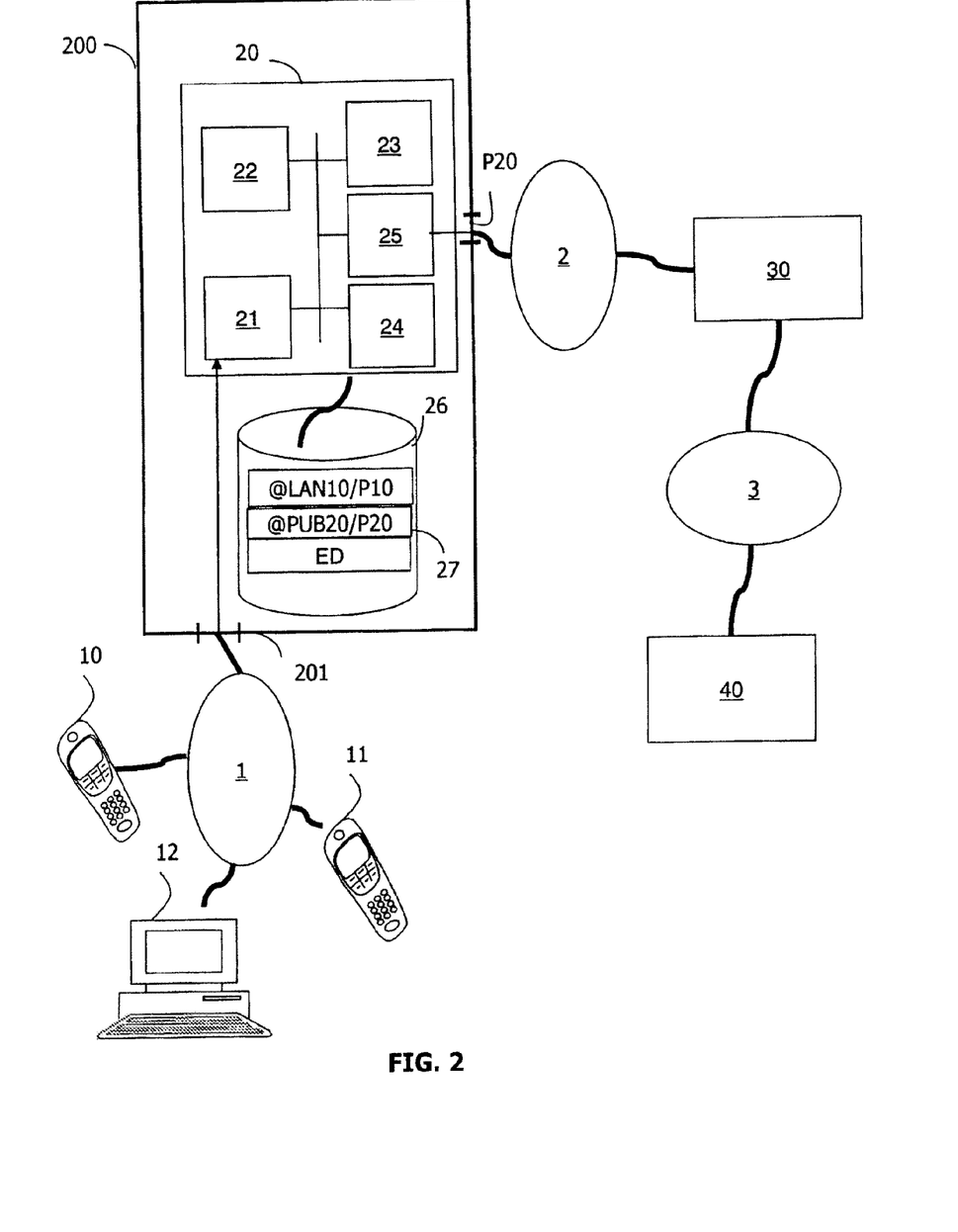
FIG. 2 shows diagrammatically and in its environment a device of one embodiment of the invention for maintaining an address translation table.

FIG. 2 shows a user terminal 10 connected to a private network (home network) 1. The private network of the user also includes another user terminal 11 and a computer 12. The customer installation is connected to a collection network 2 of the operator via a home gateway or a router modem 200. For simplicity, the expression home gateway is used below to refer to both these devices. It should nevertheless be borne in mind that the method of the invention can be implemented by any equipment having the router modem function.

A collection unit 30 relays a registration request sent by the user terminal 10 using the SIP to an application server 40 of the core network 3 implementing an IMS architecture. The expression application server refers to any entity of the telecommunications network able to exchange application signaling messages directly with the user terminal 10, for example a P-CSCF type IMS network SIP access entity. The registration request is therefore relayed to another entity of the IMS network hosting a REGISTRAR function, for example a Serving-Call Session Control Function (S-CSCF) entity.

The home gateway 200 contains an address translation table 26.

The standard function of an address translation table is to translate the combination (private address @LAN10, private port P10) of the user terminal 10 into the combination (public address @PU20, public port P20).

According to the invention, the entry 27 is specific to a succession of exchanges of application signaling messages using a given signaling protocol between the terminal 10 and a third-party entity such as the application server 40. It is created as soon as the user terminal requests to communicate with the application server 40 by sending a registration request to the IMS network using the signaling protocol. According to the invention, the entry 27 includes a validity indication ED in addition to the private and public (address, port) combinations. The entry 27 of the invention is therefore a quintuplet rather than a quadruplet as in the prior art.

The home gateway 200 further includes a device of the invention for maintaining the address translation table 20.

The home gateway 200 finally includes at least one receiver port 201 dedicated to receiving application signaling messages using the given protocol coming from one of the terminals 10, 11, 12 of the private network of the user.

In the embodiment of the invention described here, the device 20 of the invention includes hardware components conventionally found in a standard computer, namely a processor 22, a random-access memory (RAM) 23, a read-only memory (ROM) 24, telecommunications means 21 for communicating with the private network 1, and telecommunications means 25 for communicating with the public network 2.

The device 20 of the invention is connected to the address translation table 26, in which it can create or delete entries.

Figure 3:
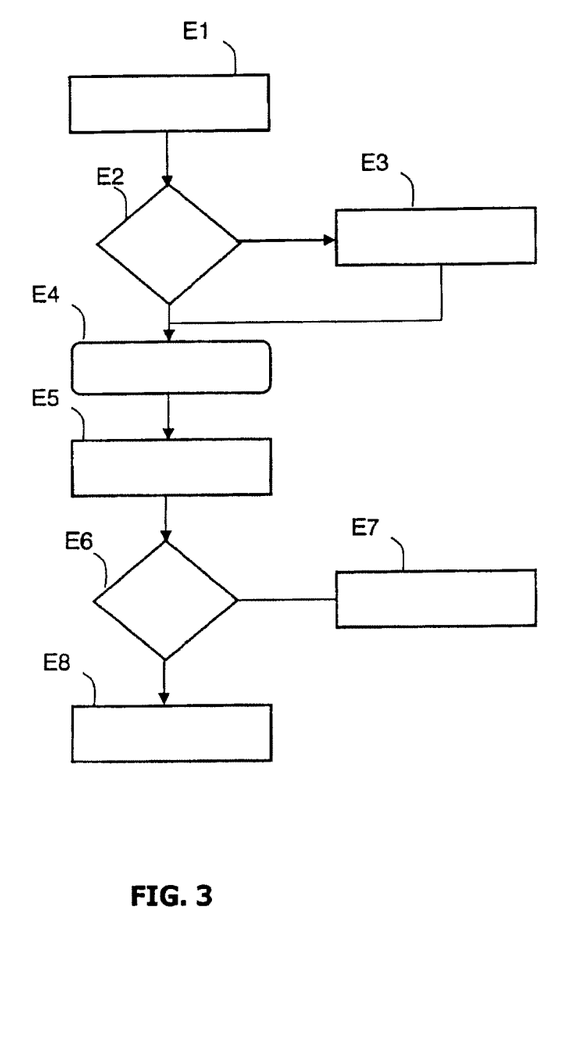
FIG. 3 shows in flowchart form steps of a method of the invention for maintaining an address translation table.
Figure 4:
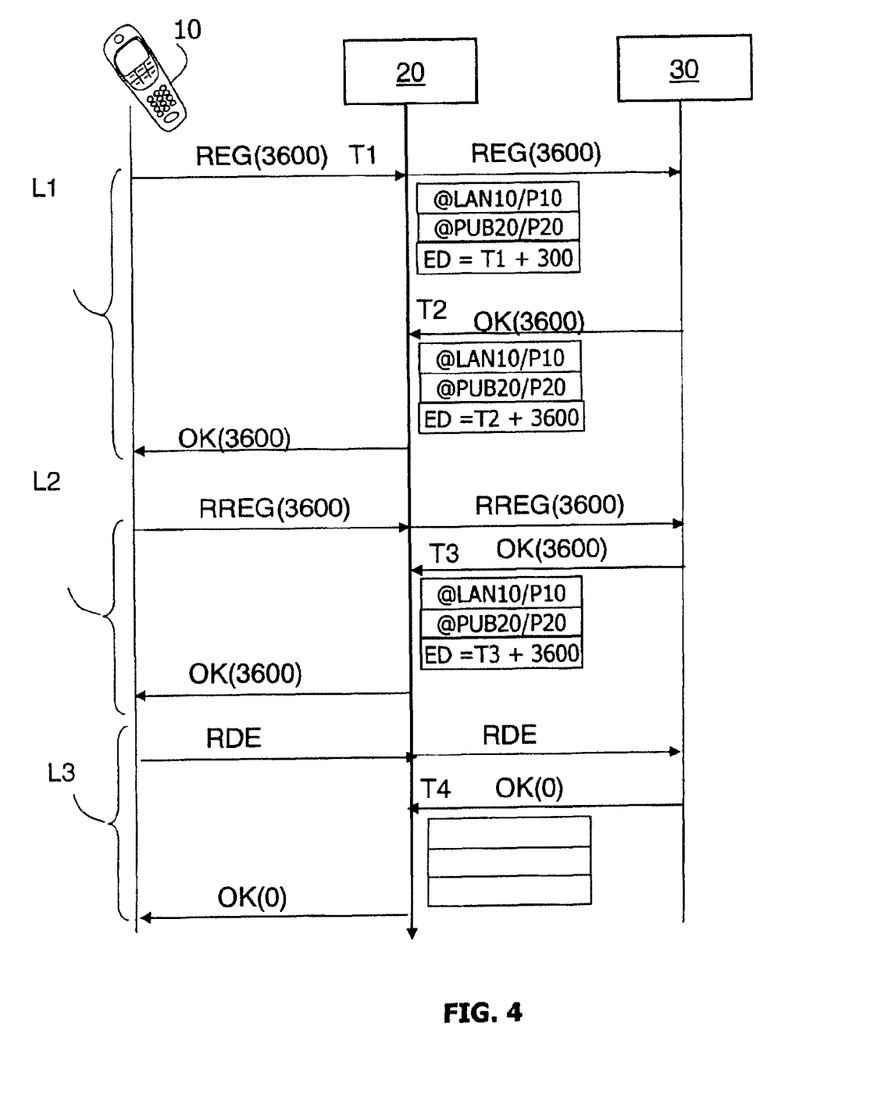
FIG. 4 shows messages exchanged in the context of the invention as described with reference to FIG. 3.

The read-only memory 24 constitutes a storage medium that stores a computer program of the invention including instructions for executing the steps of a method of the invention for maintaining an address translation table as described below with reference to FIGS. 3 and 4.

The method of maintaining an address translation table used by the device 20 includes a step E1 of intercepting a request to register for the Voice over IP (VoIP) service sent by the terminal 10 to the application server 40 and received at a home gateway receiver port 201 dedicated to the SIP application signaling protocol at a first reception time DR.

In a step E2, it verifies the existence in the address translation table 26 of an entry 27 specific to the exchange of signaling messages between said terminal 10 and the network 3 using the SIP.

If there is no entry in the address translation table 26 specific to application signaling message exchanges of this type, the method of the invention, in a step E3, creates a specific entry 27 in the address translation table 26 associating with a private address and a private port (@LAN10, P10) of the terminal 10 in its private network 1 a public address and a public port (@PUB20, P20) of the terminal in the collection network 2 and a validity indication, for example a first expiry time ED of the entry starting from the first reception time DR. It calculates the first expiry time ED by adding a first validity period, for example. Alternatively, the validity indication includes a start time and a first validity period.

According to a first aspect of the invention, this first validity period can have a predetermined value; according to a second aspect of the invention, it can be a requested registration validity period if the request from the user terminal specifies one.

According to a third aspect of the invention, the first validity period is updated in two stages. Firstly, the device for maintaining an address translation table assigns it a value of a few minutes, for example 300 seconds, at the reception time DR.

Secondly, in a step E4, it relays the application signaling message to the collection unit 30 and then waits for a response message from the application server 40 to the terminal 10.

If an entry specific to the exchange of VoIP type application signaling message exists in the address translation table 26 for the user terminal 10, the device of the invention goes directly to the step E4.

At a second reception time, in a step E5, the device of the invention intercepts a response message coming from the SIP server 40 and received at the port P20 of the home gateway 200.

If it is an authorization message, it indicates a registration validity period granted to the terminal by the application server 40, for example a validity period for an SIP registration. The SIP standard (RFC3261) specifies a default validity period of one hour, for example. For its part, the 3GPP standard specifies for the IMS system a default value of one week. Note that the invention is not limited to these examples, however, and that it applies to any other value chosen by the telecommunications network operator.

In a step E5, the device of the invention extracts the registration validity period from the received authorization message.

If it is a rejection message, the first expiry time ED is not updated. The entry 27 is deleted from the address translation table 26 when the expiry time ED is reached.

If it is a response message to an explicit deregistration request, it may indicate either a zero validity period or no period.

If it is a response message to an active subscriptions listing registration request, it may indicate one or more non-zero validity periods or no period.

In a step E6, the device of the invention tests the value of the extracted validity period. If it is not zero, it calculates in a step E27 a new expiry time E7 of the entry from the address translation table by adding the validity period to the second reception time. It then updates the quintuplet of the specific entry 27, replacing the old expiry time with the calculated expiry time.

If the validity period is zero or there is no period in the received response message, the device of the invention deletes the entry 27 from the address translation table 26 during a step E8.

Message exchanges L1 to L3 in one implementation of the invention are described below with reference to FIG. 4.

Assume, for example, that in a first application signaling message exchange L1 the user terminal 10 sends the application server 40 an SIP registration request REG (3600) to register for a service. This request is passed on to the application server 40 in succession by the home gateway 200 including the device of the invention and the user collection unit 30.

This request optionally specifies a required registration validity period, for example 3600 seconds.

This request triggers the mechanism of the invention for maintaining the address translation table.

The device 20 of the invention in the home gateway 200 intercepts the received message at the dedicated port 201 at the reception time T1. It consults the address translation table 26 of the home gateway to verify whether there exists for the terminal 10 a message specific to exchanging application signaling messages using the VoIP protocol. If so, it relays the message REG(3600) to the collection unit 30. If not, it creates an entry 27 in the address translation table 26 into which it writes the quintuplet (@LAN10, P10, @PUB20, P20, ED) using the mechanism of the invention described above. The validity indication is calculated from the time the device 20 receives the request REG and a first validity period, which can have a predetermined value or the value of the requested registration validity period.

According to one aspect of the invention, the device 20 then begins to wait for a response message from the third-party entity.

When at reception time T2 it receives a response message OK (3600) at the public port P20 created by the home gateway 200 for exchanges of the user terminal 10 with the public network, it intercepts it and extracts from it a validity period DV, if there is one.

If this period is not zero, it updates the expiry time in the entry 27 of the address translation table by T2+DV and then relays the response OK (3600) to the terminal 10.

During a second message exchange L2 the terminal 10 sends a renewal request RRE (3600) to the application server 40 before the expiry time T2+3600 is reached.

On reception of this request at the dedicated port 201 of the home gateway 200, the device 20 of the invention verifies whether an entry for the user terminal 10 exists in the address translation table 26. If so, a plurality of options are open:

According to one aspect of the invention, the device 20 updates the validity indication of the entry using a predetermined validity period value, preferably a usual registration subscription value.

According to another aspect of the invention, it extracts a requested registration validity period from the renewal request, if there is one, and updates the validity indication of the entry on the basis of the time the renewal request is received and the requested registration validity period.

According to a further aspect of the invention, it relays the request RRE (3600) directly to the collection unit 30 and awaits a response message. When the response message OK (3600) arrives at reception time T3, it updates the entry 27 of the address translation table by replacing the old validity indication with an updated value obtained from T3 and a validity period DV indicated in the response message, and then relays the response message to the terminal 10.

During a third message exchange L3, the terminal 10 sends the SIP server 40 an explicit deregistration request RDE before the expiry time T3+DV is reached.

According to one aspect of the invention, because an entry exists in the address translation table 26, the device of the invention relays this request directly. On reception of the authorization response from the SIP server 40 at reception time T4, it extracts from the message a zero validity period or notes the absence of a validity period and deletes the entry 27 from the address translation table.

The invention claimed is:

1. A device for maintaining an address translation table, placed in series between a user terminal and a third-party entity of a telecommunications network, the device comprising a hardware processor programmed:
    to intercept a registration request message sent by the user terminal to the third-party entity using an application signaling protocol, the registration request message being received by the device at a first reception time at a reception port dedicated to the exchange of messages using the application signaling protocol;
    to verify the existence in the address translation table of an entry specific to the exchange of application signaling messages using the application signaling protocol between the user terminal and the third-party entity; and
    if there is no entry specific to the exchange of application signaling messages using the application signaling protocol between the user terminal and the third-party entity:
    to create a specific entry in the address translation table associating the following with a private address and a private port of the user terminal in a private network connecting the terminal to the device: a) a public address and a public port of the user terminal in the telecommunications network: and b) an indication of the validity of the specific entry,
    wherein:
    the validity indication of the specific entry takes into account the first reception time and a first validity period, and
    the first validity period has a predetermined value that is specific to the application signaling protocol.

2. The device for maintaining the address translation table according to claim 1, wherein the registration request message sent by the user terminal includes a requested registration validity period, and the first validity period is chosen to be equal to the requested registration validity period.

3. The device for maintaining the address translation table according to claim 1, wherein it is further configured:
    to await an authorization message sent by the third-party entity to the public port of the user terminal in response to the registration request message;
    on reception at a second reception time of the authorization message from the third-party entity to the user terminal, to extract a registration validity period, if there is one; and if the registration validity period exists and it is not zero, to update the validity indication of the specific entry based on the second reception time and the extracted registration validity period.

4. The device for maintaining the address translation table according to claim 3, wherein the updated validity indication of the specific entry is calculated by adding the extracted registration validity period to the second reception time.

5. The device for maintaining the address translation table according to claim 3, wherein, if the entry specific to the exchange of application signaling messages relating to the user terminal already exists in the address translation table, the device relays the registration request message directly to the third-party entity and awaits the authorization message in response to the registration request message.

6. The device for maintaining the address translation table according to claim 3, wherein, on reception of the authorization message including a zero registration validity period or no registration validity period, the device can delete the specific entry from the address translation table.

7. A home gateway or router modem for connecting a user terminal of a private network to a third-party entity of a telecommunications network, the home gateway or router modem comprising:
an address translation table configured to store an entry specific to the exchange of application signaling messages between the user terminal and the third-party entity of the telecommunications network using an application signaling protocol, the entry specific to the exchange of application signaling messages associating a private address and a private port of the user terminal in the private network with a public address and a public port of the user terminal in the telecommunications network, and an indication of the validity of the entry specific to the exchange of application signaling messages; and
a code for maintaining the address translation table configured:
to intercept a registration request message sent by the user terminal to the third-party entity using the application signaling protocol, the registration request message being received at a first reception time at a reception port dedicated to the exchange of messages using the application signaling protocol;
to verify the existence in the address translation table of the entry specific to the exchange of application signaling messages using the application signaling protocol between the user terminal and the third-party entity; and
if there is no entry specific to the exchange of application signaling messages using the application signaling protocol between the user terminal and the third-party entity; to create a specific entry in the address translation table associating the following with the private address and the private port of the user terminal in the private network connecting the terminal to a device a) the public address and the public port of the user terminal in the telecommunications network; and b) an indication of the validity of the specific entry, wherein: the validity indication of the specific entry takes into account the first reception time and a first validity period, and the first validity period has a predetermined value that is specific to the application signaling protocol.

8. A non-transitory computer readable medium storing an address translation table configured to store an entry relating to a user terminal, the entry associating a private address and a private port of the user terminal in a private network with a public address and a public port of the user terminal in a telecommunications network, the address translation table comprising:
an entry specific to an exchange of application signaling between the user terminal and a third-party entity of the telecommunications network using an application signaling protocol, the entry specific to the exchange of application signaling further comprising an indication of the validity of the entry specific to the exchange of application signaling, the validity indication of the specific entry taking into account a first reception time and a first validity period, wherein the first validity period has a predetermined value that is specific to the application signaling protocol.

9. A method of maintaining an address translation table configured to be implemented by a device placed in series between a user terminal of a private network and a third-party entity of a telecommunications network, the method comprising the steps of:
intercepting a registration request message sent by the user terminal to the third-party entity using an application signaling protocol, the registration request message being received by the device at a first reception time at a reception port dedicated to exchange of application signaling messages using the application signaling protocol;
verifying the existence in the address translation table of an entry specific to the exchange of application signaling messages using the application signaling protocol between the user terminal and the third-party entity; and
if there is no entry specific to the exchange of application signaling messages using the application signaling protocol between the user terminal and the third-party entity:
creating a specific entry in the address translation table associating the following with a private address and a private port of the user terminal in the private network connecting the terminal to the device: a) a public address and a public port of the user terminal in the telecommunications network; and b) an indication of the validity of the specific entry,
wherein:
the validity indication of the specific entry takes into account the first reception time and a first validity period, and
the first validity period has a predetermined value that is specific to the application signaling protocol.

10. The method of maintaining an address translation table according to claim 9, the method further comprising the steps of:
awaiting an authorization message sent by the third-party entity to the public port of the user terminal in response to the registration request message;
on reception at a second reception time of the authorization message from the third-party entity to the public port of the user terminal, extracting a registration validity period, if there is one; and
if the registration validity period exists and it is not zero, updating the validity indication of the specific entry based on the second reception time and the registration validity period.

11. A non-transitory computer readable medium storing a computer program comprising instructions for executing the method of maintaining the address translation table according to claim 9, when the computer program is executed by a computer.

\* \* \* \* \*